United States Patent Office 3,544,476
Patented Dec. 1, 1970

3,544,476
COAGULANT AND METHOD FOR TREATING AQUEOUS MEDIUM COMPRISING A BASIC METAL SALT AND A MULTIVALENT ANION
Yoshikazu Aiba and Takaki Furumori, Kakogawa, Japan, assignors to Taki Fertilizer Manufacturing Co., Ltd., Kakogawa, Japan
No Drawing. Filed May 3, 1968, Ser. No. 726,583
Claims priority, application Japan, May 9, 1967, 42/29,267
Int. Cl. C02b 1/20, 5/02; C02c 5/02
U.S. Cl. 252—175   11 Claims

ABSTRACT OF THE DISCLOSURE

A coagulating agent for the treatment of an aqueous medium comprises a basic metal salt of the formula:

$$M_n(OH)_m X_{3n-m}$$

wherein M is a tri- or more valent metal, X is Cl, $NO_3$ or $CH_3COO$, $3n$ is larger than $m$, and the basicity $$(m/3n \times 100)$$

is about 30 to 83%, an anion (Y)—for example, sulfuric acid ion, phosphoric acid ion—having been chemically introduced into the basic salt in an amount such that the molar ratio $Y/M$ is more than about 0.015 but less than the amount which would impair the stability of the basic salt. Preparation of the coagulating agent and use thereof in treating an aqueous medium are also described.

---

This invention relates to a coagulant for coagulating and flocculating substances suspended or dissolved in water and more particularly to an improved coagulant comprising of a particular basic metal salt.

In treating effluent water, ground water, sewage, excreta and waste water in the chemical, metallurgical, dyeing or starch industry, etc., various coagulants have been already used. For such conventional coagulants can be enumerated, for example, not only aluminum sulfate but also ferrous sulfate, ferric sulfate, chlorinated copper as, ferrous chloride, ferric chloride and aluminum chloride. Further, as assistants for coagulation are used usually slaked lime, activated silica, sodium silicate and bentonite.

Such known coagulant has an action of coagulating together such fine matters which are suspended or dissolved in the aqueous system to be treated and which can not be settled within a reasonable time by natural setting, and also has an action of growing them to be large coagulated flocs which are easy to be filtered and separated into the liquid phase. However, such coagulants cannot be applied to all purposes but have a limited effect due to its own mechanism on coagulation.

On the other hand, in recent years, with the development of the chemistry on basic metal salts, there have been proposed some examples of applying them to various fields as new inorganic coagulants. For example, the application of basic aluminum (chromium or iron) chloride to the treatment of sewage sludges or industrial waste water has been suggested in U.S. Pat. No. 2,858,269 and British Pat. No. 1,045,731. Further, the same are found in The Effluent and Water Treatment Journal, July 1964 and Waste Engineering, July 1960. According to these suggestions or researches, it has been made clear that basic aluminum (chromium, iron) chloride has some advantageous properties as compared with aluminum sulfate and chlorinated copper as so far used in this field. There are also known some literatures (e.g. U.S. Pat. No. 3,270,001) showing the superiority of basic aluminum chloride in the treatment of river water, underground water and pulp waste water.

In short, it is known that a basic aluminum salt has advantages that it is higher in the coagulating and flocculating effect than, for example, aluminum sulfate. In some cases, the former has an effect several times as high as the latter on $Al_2O_3$ basis. More particularly, its coagulating pH range is wider, the formation and settlement of flocs are faster, flocs formed is larger and the reduction of turbidity after the treatment is more remarkable.

It is an object of this invention to provide an improved and novel coagulant for treating an aqueous medium, whereby substances suspended or dissolved in water to be treated can be more easily and effectively coagulated and flocculated.

It is another object of this invention to provide a novel coagulant which comprises a particular water soluble basic metal salt which enables more easy and effective coagulation and flocculation of the substances suspended or dissolved in water to be treated.

It is still another object of this invention to provide an improved method for effectively coagulating and flocculating substances suspended or dissolved in water to be treated, said method being economical in that only a small amount of inexpensive coagulating agent is required, operation is quite simple and no expensive apparatus is required.

Briefly these and other objects of this invention are accomplished by providing and using a coagulant which comprises a basic salt of the formula:

$$M_n(OH)_m X_{3n-m} \qquad (I)$$

wherein M is a tri- or more valent metal, X is an anion forming a monovalent acid, $3n$ is larger than $m$ and the basicity $(m/3n \times 100)$ is in a range of about 30 to 83%, an anion (hereinafter referred to as Y) having been chemically introduced into the basic salt, said anion Y being that being able to form a di- or more valent (functional) acid.

The metal represented by M in the above Formula I may be selected from aluminium (Al), chromium (Cr) and iron (Fe), among which Al is most preferable.

The anion Y to be introduced into the basic salt of the Formula I is selected from inorganic and organic multivalent anions. Examples of them are anions of sulfuric, phosphoric, condensed (or poly-) phosphoric, silicic, chromic, bichromic, carboxylic (citric, oxalic, fumaric, succinic, malonic, etc.) and sulfonic (e.g., alkyl aryl sulfonic) acids, among which sulfuric, phosphoric, silicic and oxalic acids are preferable.

The multivalent anion Y can be introduced in the form of acid or of its soluble salt (such as sodium, ammonium salt).

Examples of anions represented by X in the Formula I are Cl, $NO_3$, $CH_3COO$, among which Cl is preferred.

The amount of the anion Y to be introduced should be such that the molar ratio of $Y/M$ is more than about 0.015 but less than the amount impairing the stability of said basic salt.

In the following explanation, for the sake of convenience, the coagulant will be explained as in the form wherein M is Al, X is Cl, that is, basic aluminum chloride which is well known in the art. Such known aluminum chloride shall be abbreviated as BAC, and the novel basic aluminum chloride containing multivalent acid ion (Y) of the present invention shall be referred to as BACS in the following description.

It is already well known that, in an aqueous solution of the aluminum sulfate, aluminum ions will react to produce an insoluble compound (basic aluminum sulfate precipitate) above a certain pH. (For example, refer to "Journal of Pharmacological Science" ("Yakugaku Zasshi" in Japanese) vol. 74, pages 253–258.)

On the other hand, we have found that the BACS of the present invention obtained by modifying BAC to contain therein multivalent acid ion (Y) under the above mentioned specific condition will produce no insoluble compound and will remain a stable transparent solution in water over a long period of time. We have also found that, when the BACS is used as a coagulant, for example, for sewage sludges, it will develop a coagulating and flocculating effect far superior to that of BAC, and have come to accomplish the present invention on the basis of these findings.

For example, in the case of treatment of sewage sludges, according to the descriptions in the above mentioned Effluent and Water Treatment Journal, such salt consisting of a monovalent anion and a multivalent cation (for example, iron chloride) is considered to be preferable and the effect of such coagulant containing a multivalent anion as sulfuric acid ion is rather denied. However, it has now been surprisingly found that BACS of the present invention obtained by making a multivalent acid ion (Y) positively coexist with or in BAC is better than BAC in such general performances as the broad coagulating pH range, high floc forming velocity, settleability and size of flocs, residual turbidity and saving of the alkali assistant.

Generally raw water to be treated for coagulation may sometimes contain in itself multivalent anions, for example, sulfuric acid ions in various forms. However, taking as an example sulfuric acid ion, in understanding the present invention, the sulfuric acid ion in raw water and the sulfuric acid ion in BACS of the present invention must be distinctly distinguished from each other.

Thus, in order to demonstrate the difference, 100 mg. of purified kaolin were suspended in 1 liter of tap water and were stirred and dispersed. The analysis of this suspension was as follows:

Turbidity: 100°
Colored degree: 4°
pH: 7.40
Total hardness: 61.32
$SO_4$: 26.68 p.p.m.
Cl: 39.30 p.p.m.
$SiO_2$: 2270 p.p.m.
M alkali degree: 47.55

4 p.p.m. (calculated as $Al_2O_3$) of each of BAC (basicity 50%) and BACS (basicity 50% and a mol ratio of $SO_4/Al$ 0.128), as a coagulant, were added to the above mentioned suspension to carry out jar tests: The jar test was conducted according to the method described in ASTM in which the suspension was stirred flashly at 120 r.p.m. for 1 minute and slowly for 20 minutes and was left standing for 15 minutes. The results are shown in the following table.

|  | pH of raw water | | | |
| --- | --- | --- | --- | --- |
|  | 6.5 | 7.0 | 8.0 | 9.00 |
| Size of flocs (mm.): | | | | |
| BAC | 0.1 | 0.2 | 2.0 | 2.0 |
| BACS | 4.0 | 4.5 | 5.0 | 4.5 |
| Time required for settlement of flocs (minutes): | | | | |
| BAC | >10 | >10 | 6 | 6 |
| BACS | 4 | 0.5 | 0.5 | 0.5 |
| Residual turbidity: | | | | |
| BAC | 50 | 12.5 | 1.0 | 0.8 |
| BACS | 0.7 | 0.5 | | |

As evident from the above table, BACS showed effects far better than BAC in all the items. Such facts that the flocs are larger, that the time required for the settlement is shorter and that the pH range proper for the coagulation and flocculation is wider will bring about great advantages in the actual large scale operation, because, for example, the capacity of the coagulating equipment can be increased, and the equipment having the given capacity can be made more compact.

It should be noted that the above mentioned raw water contained 26.68 p.p.m. of $SO_4$, while the $SO_4$ brought about from BACS was only 0.96 p.p.m., which was substantially quantitatively negligible Therefore, the fact that the results of the respective treatments of the same raw water with BAC and BACS are so greatly different as mentioned above cannot help being considered to be because the $SO_4^{--}$ introduced in advance into BAC (to result in BACS) showed some peculiar action on the coagulation performances. That is to say, in the present invention, it is essentially necessary that $SO_4$ should be taken in advance into the coagulant before use.

The operative mechanism of the multivalent anion (Y), e.g. sulfuric ion in present invention has not fully been ascertained but is presumed to be as follows. Thus, aluminium ions in BAC present in the form of stable polynuclear complex ions by coordinating 6 molecules of water. Sulfuric acid ions made to positively coexist with BAC will be taken into the above mentioned polynuclear complex ions and will be able to maintain the form of a stable solution while performing an action of cross-linking aluminum as M—$SO_4$ together with —OH groups. It appears that this particular form of coagulant accelerates the formation of flocs and the adsorption and coagulation of suspended matters by the quick hydrolysis due to the presence of sulfuric acid ions.

The range of the amount of multivalent acid ions (Y) to be contained in BACS of the present invention should be as follows. That is to say, in order to maintain stable BACS, it is necessary to reduce the acid ion content (i.e. the mol ratio of $Y/M$ is made smaller) in response to the increase in the basicity of BACS. Further the content of the acid ion (Y) should be such that, during the production or sorting or in the case of adjusting the concentration at the time of using of the coagulant, the coagulant is not gelled. More specifically, the multivalent acid ion content should be selected so that mol ratio of $Y/M$ is about 0.015 to 0.4, preferably 0.05 to 0.3 in response to the basicity of BAC. For example, in case the basicity of BACS is 50, 66 or 80%, sulfuric acid ion may be contained so that mole ratio $SO_4/Al$ is less than about 0.35, 0.3 or 0.16, respectively. It should be understood that the amount of multivalent acid ion is closely related with not only the stability of BACS but also the coagulating activity thereof.

Any suitable procedure may be used in introducing such multivalent acid ion into BAC. Thus, for example, BACS may be obtained by adding a compound selected from the above mentioned multivalent acids and their soluble salts, for example, sodium sulfate, potassium sulfate, sodium phosphate, phosphoric acid and sulfuric acid to an aqueous solution of BAC prepared by a known method (for example, according to U.S. Pat. No. 2,196,016) so that the mol ratio of Y to M may be in the above mentioned range. Further, in the course of the method described in U.S. Pat. No. 2,196,016, BACS can be produced, if the reaction mentioned therein is conducted in the presence of a predetermined amount of multivalent acid ion in a decomposition solution, e.g. hydrochloric acid solution, of Al.

Further, a BACS may also be obtained in the separation of insoluble sulfate produced by adding a hydroxide, oxide or carbonate of a metal selected from calcium and barium to a solution of a normal salt of aluminum containing hydrochloric acid and sulfuric acid ions. In this case, the above operation is conducted in such a manner that sulfuric acid ion in an amount in the above mentioned range may remain in the mother liquor.

It is preferable that the BACS solution produced as above is aged more or less. For example, it is left standing at the room temperature for more than 2 hours, because BACS as freshly produced by introducing a multivalent acid ion into BAC as mentioned above will show only a coagulating effect substantially equal to that of BAC.

When the basicity of BACS of the above mentioned general formula remarkably deviates from the above mentioned range of 30 to 83%, there will be no good effect. The BACS may be commercially supplied usually in the form of an aqueous solution of a concentration of about 5 to 20% by weight (calculated as $Al_2O_3$) although other range of concentration may also be used. In some cases, the BACS may be in the form of a solution of a concentration lower than that or it may be in a dry powdered form.

The coagulant (BACS) of the present invention can be used in those cases where it is necessary or desired to accelerate the coagulation and flocculation of particles suspended in an aqueous medium and to quickly separate the particles from the liquid. It can be effectively utilized to treat, for example, effluent water, underground water, sewage sludge, excreta and industrial water or to treat waste water from the chemical, metallurgical, dyeing or starch industry etc.

The amount of addition or use of BACS of the present invention is varied depending not only on such properties (e.g. the concentration, size and electric charge of the suspended particles) of the liquid to be treated. Generally it is satisfactory to add about 1 to 10,000 p.p.m. (as of $Al_2O_3$) of the BACS when the liquid to be treated is a fine particle suspension. More particularly, when the concentration of the suspended particles is high as in the case of sewage sludge, it is preferable that BACS is used in an amount of about 10 to 10,000 p.p.m. (as of $Al_2O_3$). In case the liquid to be treated is such raw water of a comparatively low turbidity as underground water or river water it is preferable to add BACS in an amount of about 1 to 100 p.p.m. (as $Al_2O_3$) to said raw water.

The pH of the water or aqueous medium to be treated with the coagulant of this invention may vary over a wider range than with a conventional coagulant, e.g. aluminum sulfate etc., although a pH within the range from 4 to 10, more particularly 5–9 is preferable. Thus, for example, as the pH of usual sewage sludge is about 7.0, it is possible to treat the sludge without an alkali aid such as slaked lime.

The operation for coagulation and flocculation by the coagulant of this invention is quite simple and no expensive apparatus is required. Therefore, it is possible to adopt a conventional manner of water treatment.

The aqueous media which may be treated with the coagulant of the present invention are, for example, primary, digested and activated sludges of sewage (derived from industrial waste water and domestic sewage). The main concerns in these technical fields are concentrated on saving the amount of the coagulant to be used, attaining the coagulation quickly and facilitating the filtration and dehydration of the coagulated sludges.

When the novel treating agent of the present invention is applied to the ordinary treating process of the above mentioned objects, it will contribute to the reduction of some of the above mentioned difficulties in the treating operation.

In the case of treatment of a sewage, the sewage introduced into a treating plant is first subjected to a pretreatment to have coarse matters (such as sand, pebbles, wood, bamboo and cloth) removed and is then subjected to a dehydrating operation so as to be converted to be in a state easy to handle. In such case, in order to accelerate the coagulation and settlement of the sludge and to improve the dehydrating characteristics, a coagulant (conditioning agent) is used. BACS of the present invention is added and used instead of the conventional iron chloride or the like in this stage to form and settle coagulations under stirring. The treating operation with the BACS of the invention may be carried out in a conventional manner so that no special apparatus is required.

When BACS is used to coagulate sewage sludges, there are obtained such many advantages such as follows as compared with the use of conventional BAC:

(1) The amount of coagulant required is greatly reduced and the economical advantage will be large;
(2) The amount of production of cakes and amount of the filtrate which are respectively indices of the coagulating and filtering velocities will increase;
(3) The peelability of the cakes will be high;
(4) The turbidity after the treatment will reduce;
(5) The use of an alkali assistant will become unnecessary or its amount required will be reduced.

Examples of the production of BACS and the treatment of various water by BACS shall be given in the following. However, they are all given for illustration. The present invention can be applied to the treatment of any aqueous suspension or sludge without deviating from the scope of this invention.

PREPARATION 1

520 g. of hydrochloric acid (2 N) were placed in a reactor made of glass and provided with a reflux condenser and were preheated to 60° C. Then, 80 g. of sodium sulfate decahydrate were added thereto and dissolved. Then 27 g. of a metallic aluminum powder (purity 99.98%) were gradually added thereto and were allowed to react at a temperature of 90 to 100° C. for 3 hours to obtain a transparent solution of BACS having the following composition:

$Al_2O_3$: 8.13%
Cl: 2.82%
Basicity: 67%
Mol ratio of $SO_4/Al$: 0.25

Further, for comparison, in the above mentioned example, BAC was produced under the same conditions without using sodium sulfate decahydrate. The composition of the resulting BAC was as follows:

|  | Percent |
|---|---|
| $Al_2O_3$ | 9.33 |
| Cl | 3.24 |
| Basicity | 67 |

PREPARATION 2

90 g. of an industrial aluminum hydroxide powder (58.5% $Al_2O_3$) were suspended in 290 g. of water, and the suspension was gradually poured with stirring into a mixed acid solution of 77 g. of concentrated sulfuric acid (95.6% $H_2SO_4$) and 148 g. of 37.2% hydrochloric acid contained in an open type vessel made of glass and provided with a stirrer. The mixture was allowed to react at 90 to 95° C. for 2 hours to obtain a transparent solution. When a slurry prepared by suspending 55 g. of calcium carbonate in 55 g. of water was gradually added to the solution to react at 75 to 80° C. for 40 minutes, crystals of calcium sulfate dihydrate were deposited. The crystals were then filtered and separated. The solution (mother liquor) was recovered. The composition of the solution was as follows:

$Al_2O_3$: 11.17%
Cl: 11.63%
$SO_4$: 5.26%
Al/Cl (N): 2.01
Basicity: 50.2%
Mol ratio of $SO_4/Al$: 0.25

PREPARATION 3

32.2 g. of sodium sulfate decahydrate were dissolved together with 50 g. of water into 260 g. of 2-normal hydrochloric acid. To this solution were added 27 g. of metallic aluminum powder and the reaction was proceeded while stirring at about 90° C. for 3 hours until all the aluminum is dissolved, to obtain BACS. The composition of the BACS obtained was as follows:

$Al_2O_3$: 13.80%
Cl: 4.88%
Basicity: 83%
$SO_4/Al$: 0.1
Yield (as aluminum): 95%

PREPARATION 4

9.25 g. of metallic aluminum powder were added slowly to 100 g. of hydrochloric acid (HCl 15%) and were reacted at about 90° C. for 2 hours. Then, 8.39 g. of phosphoric acid ($H_3PO_4$ 100%) and suitable amount of water were added. The solution was aged at 80° C. for 30 minutes. The resulting solution was transparent for a long period of time. Yield 142 g. The composition of this solution was as follows:

|  | Percent |
|---|---|
| $Al_2O_3$ | 13.23 |
| Cl | 11.22 |
| Basicity | 59.4 |
| $PO_4$ | 6.1 |

In each of the following examples, the BAC indicated for comparison was same as the BACS employed in the same example except that the multivalent anion had not been introduced.

EXAMPLE 1

To o digested sludge containing 4.1% dry solids were added and mixed various treating agent solutions (5% $M_2O_3$) and slaked lime (for pH adjustment) so as to be respectively 2.5% ($M_2O_3$) (0.025 p.p.m. of $M_2O_3$ in respect of the total amount of the same sludge) and 5% based on the dry solids, and mixed. Then, the amount of the filtrate, water contained in cakes, amount of production of cakes and the peelability of the cakes were measured by leaf tests.

Leaf testing conditions:

Filtering area: 96.7 cm.$^2$
Dipping time: 1 min., 30 sec.
Dehydrating time: 3 min., 30 sec.
Vacuum degree: 700 mm. Hg (For the details of the leaf testing operation, see "Sewage Testing Methods" 1964 published by Japan Water Society.)

TABLE 1.—RESULTS OF LEAF TESTS

| Coagulating agent | Amount of filtrate (ml.) | pH of filtrate | Water (percent) in cakes | Formation of cakes (kg./m.$^2$/hr.) | Peel ability of cakes |
|---|---|---|---|---|---|
| Ferric chloride | 91 | 7.1 | 79.4 | 2.9 | Good. |
| Ferric sulfate | 94 | 6.7 | 79.5 | 3.2 | Fair. |
| Aluminum sulfate | 97 | 6.6 | 79.8 | 3.1 | Do. |
| BAC | 142 | 7.8 | 79.5 | 4.8 | Excellent. |
| BACS | 200 | 7.5 | 80.0 | 5.9 | Do. |

PREPARATION 5

Coagulants (BACS) which comprise basic aluminum chloride containing various multivalent anions were produced according to the method of the above mentioned Preparation 4. The compositions were as follows:

| Multivalent anion introduced (Y) | $Al_2O_3$ (percent) | Cl (percent) | Y/Al mol ratio | Basicity (percent) |
|---|---|---|---|---|
| Chromic | 10.0 | 8.35 | 0.25 | 60 |
| Bichromic | 10.0 | 8.35 | 0.25 | 60 |
| Oxalic | 10.0 | 8.35 | 0.2 | 60 |
| Fumaric | 10.0 | 8.35 | 0.018 | 60 |
| Succinic | 10.0 | 8.35 | 0.2 | 60 |

The following examples illustrate the use of coagulants of this invention. In these examples, the coagulants employed were as follows:

In the above table, BACS and BAC were the products of Preparation 1.

As shown in the above table, in the amount of production of cakes and the amount of the filtrate which are respectively indices of the coagulating and filtering velocities, BAC is higher than the other coagulating agents, and BACS of the present invention is the highest.

EXAMPLE 2

To a primary sludge containing 6.3% dry solids were added BAC and BACS (product of Preparation 2) so as to be 2, 3 and 4% (calculated as $Al_2O_3$) on the basis of the dry solids. Then leaf tests were conducted. The conditions of the leaf tests were the same as in Example 1

| Y | | Y/M mol ratio | Basicity (percent) | Example No. | M | X |
|---|---|---|---|---|---|---|
| Coagulant: | | | | | | |
| C-1 | $SO_4$ | 0.25 | 67 | 1 | Al | Cl |
| C-2 | $SO_4$ | 0.25 | 50 | 2 | Al | Cl |
| C-3 | $SO_4$ | 0.10 | 83 | 3 | Al | Cl |
| C-4 | $SO_4$ | 0.218 | 61.6 | 4,5,6,7 | Al | Cl |
| C-5 | $SO_4$ | 0.130 | 51.0 | 4,5 | Al | Cl |
| C-6 | $SO_4$ | 0.125 | 58.3 | 4,7 | Al | Cl |
| C-7 | $SO_4$ | 0.054 | 71.6 | 4 | Al | Cl |
| C-8 | $PO_4$ | 0.025 | 59.4 | 8 | Al | Cl |
| C-9 | $PO_4$ | 0.05 | 59.4 | 9 | Al | Cl |
| C-10 | $PO_4$ | 0.25 | 59.4 | 10 | Al | Cl |
| C-11 | $CrO_4$ | 0.25 | 60.0 | 11 | Al | Cl |
| C-12 | $Cr_2O_7$ | 0.25 | 60.0 | 12 | Al | Cl |
| C-13 | $C_2O_4$ | 0.20 | 60.0 | 13 | Al | Cl |
| C-14 | OCOCH·COO | 0.002 | 60.0 | 14 | Al | Cl |
| C-15 | OOC·$CH_2$·$CH_2$·COO | 0.2 | 60.0 | 15 | Al | Cl |
| C-16 | OOC·$CH_2$·$CH_2$·COO | 0.025 | 50.5 | 16 | Al | $NO_3$ |
| C-17 | OOC·$CH_2$·$CH_2$·COO | 0.05 | 50.5 | 17 | Al | $NO_3$ |
| C-18 | OOC·$CH_2$·$CH_2$·COO | 0.1 | 50.5 | 18 | Al | $NO_3$ |
| C-19 | OOC·$CH_2$·$CH_2$·COO | 0.2 | 50.5 | 19 | Al | $NO_3$ |
| C-20 | $SiO_3$ | 0.025 | 60 | 20 | Al | Cl |
| C-21 | $SiO_3$ | 0.05 | 60 | 21 | Al | Cl |
| C-22 | $SiO_3$ | 0.1 | 60 | 22 | Al | Cl |
| C-23 | $SiO_3$ | 0.2 | 60 | 23 | Al | Cl |
| C-24 | $SO_4+PO_4$ | 0.05 | 33 | 24 | Cr | Cl |
| C-25 | $SO_4+PO_4$ | 0.1 | 33 | 25 | Cr | Cl |
| C-26 | $SO_4+PO_4$ | 0.2 | 33 | 26 | Cr | Cl |
| C-27 | $SO_4+PO_4$ | 0.4 | 33 | 27 | Cr | Cl |

REMARKS: In the coagulants C-24 to C-27, the molar ratio $SO_4/PO_4$ was 1.

except that the vacuum degree was made 500 mm. Hg. The results are shown in the following:

TABLE 2

| Coagulating agent | Amount (percent) | Amount of filtrate (ml.) | Formation of Cakes (kg./m.²/hr.) | Peelability of cakes |
|---|---|---|---|---|
| BAC | 2 | 101 | 7.9 | Good. |
|  | 3 | 141 | 10.2 | Do. |
|  | 4 | 160 | 12.1 | Excellent. |
| BACS | 2 | 127 | 9.9 | Good. |
|  | 3 | 160 | 12.2 | Excellent. |
|  | 4 | 195 | 14.4 | Do. |

As shown in the above table, the BACS of the invention, even in smaller amount, attained the same effect as BAC, in the coagulating and filtering velocities and the state of cakes.

EXAMPLE 3

To an active sludge containing 2.1% dry solids were added 2.5% (as $Al_2O_3$) of each of BAC and BACS prepared in Preparation 3 and 10% slaked lime (as a pH adjusting agent) based on the weight of the dry solids. The mixture was stirred and the turbidity of the supernatant liquor and settled volume after the lapse of a fixed time were measured.

TABLE 3

| Coagulating agent | pH of supernatant | Settled volume (ml.) | | | | | | Turbidity | |
|---|---|---|---|---|---|---|---|---|---|
|  |  | 10 min. | 20 min. | 35 min. | 50 min. | 60 min. | 140 min. | 60 min. | 120 min. |
| BAC | 9.0 | 810 | 670 | 620 | 590 | 570 | 510 | 142 | 163 |
| BACS | 8.6 | 780 | 660 | 630 | 610 | 600 | 560 | 30 | 33 |

As shown in the above table, the product BACS of the present invention is larger in the settled volume than BAC and is also lower in the turbidity of the supernatant liquor.

EXAMPLE 4

As shown in the following table, four kinds of BACS different in the mol ratio of $SO_4/Al$, BAC and aluminum sulfate were prepared and were subjected to jar tests.

TABLE 4

| Coagulant | $Al_2O_3$ (percent) | Cl (percent) | $SO_4$ (percent) | Mol ratio $SO_4/Al$ | Basicity |
|---|---|---|---|---|---|
| BACS-I | 11.94 | 9.58 | 4.94 | 0.218 | 61.6 |
| BACS-II | 6.43 | 6.58 | 1.58 | 0.130 | 51.0 |
| BACS-III | 10.04 | 8.76 | 2.35 | 0.125 | 58.3 |
| BACS-IV | 12.36 | 7.33 | 1.25 | 0.054 | 71.6 |
| BAC | 12.40 | 9.55 |  |  | 63.0 |
| Aluminum sulfate | Industrial JIS product | | | | |

BACS–I was produced according to the method of the above mentioned Preparation 1, BACS–II and BACS–III were produced according to the method of the Preparation 2, and BACS–IV was produced according to the method of the Preparation 3.

The jar test was conducted according to ASTM, Designation D 2035–64T. Thus, to 1 liter of sample water was added the coagulant and the mixture was then stirred flashly for 1 minute at 120 r.p.m. and slowly for 20 minutes, and was left standing for 15 minutes. The supernatant liquor for about 2 cm. from the water surface was taken and its turbidity and pH were measured. The floc producing velocity was measured at the time of stirring the water and the settling velocity was measured at the time of leaving it standing. Further, the indication of the sizes of the flocs was made according to the following standards:

|  | Mm. |
|---|---|
| Large | 3–5 |
| Medium | 2–3 |
| Small (about | 1.0 |
| Very small | <0.5 |

Underground water of a raw water turbidity of 108° and a pH of 7.3 was taken, and 3 p.p.m. of each of the above mentioned coagulating agents were added thereto, and was subjected to the jar test. The results were as follows. The pH of the raw water was adjusted to be 8 to 8.4.

TABLE 5

| Coagulating agent | pH | Flocs | | Settling velocity (min.) | Turbidity of supernatant liquor |
|---|---|---|---|---|---|
|  |  | Forming velocity (sec.) | Size |  |  |
| BACS-I | 8.75 | 30 | Large | 6 | 2.1 |
| BACS-II | 8.42 | 30 | Rather large | 6 | 1.7 |
| BACS-III | 8.75 | 40 | do | 8 | 1.2 |
| BACS-IV | 8.73 | 60 | Medium | 10 | 2.2 |
| BAC | 8.88 | 120 | Small | >10 | 2.3 |
| Aluminum sulfate | 8.59 | 150 | Very small | (¹) | 61.0 |

¹ Not settled.

From the above table, it will be found that BACS is superior to not only aluminum sulfate but also BAC in the respective items of flocs as indices representing the coagulating effect and in the turbidity of the supernatant liquor.

EXAMPLE 5

The river water (turbidity of 9°, colored degree 30, pH 7.3) was taken, and 5 p.p.m. (as $Al_2O_3$) of each of BACS–I, II and IV and BAC of Example 4 were added thereto, and the mixture was tested according to the method in Example 4.

TABLE 6

| Coagulating agent | pH after the treatment | Flocs | | Settling velocity (min.) | Turbidity of supernatant liquor |
|---|---|---|---|---|---|
|  |  | Forming velocity (sec.) | Size |  |  |
| BACS-I | 7.16 | 30 | Large | 2 | 1.1 |
| BACS-II | 7.0 | 45 | do | 2.5 | 1.2 |
| BACS-IV | 7.1 | 60 | Rather large | 6 | 1.2 |
| BAC | 7.1 | 60 | Medium | 9 | 1.2 |

As apparent from the above table, all of the BACS were higher in the coagulating effects than BAC.

EXAMPLE 6

In this example, in order to observe the influences of pH and of the amount of addition of coagulant in treating raw water, the raw water in Example 5 was treated by using BACS–I of Example 4. The results were as in the following table.

TABLE 7

| pH after the treatment | Flocs | | Settling velocity (min.) | Turbidity of supernatant liquor | Amount of coagulant (as $Al_2O_3$), p.p.m. |
|---|---|---|---|---|---|
|  | Forming velocity (sec.) | Size |  |  |  |
| 5.15 | 30 | Very large | 1.5 | 1.5 | 5 |
| 6.30 | 30 | do | 1.5 | 0.9 | 5 |
| 7.16 | 30 | Large | 2 | 1.1 | 5 |

TABLE 8.—RESULTS OF TESTS OF THE AMOUNTS OF ADDITION

| Amount of coagulant (as Al$_2$O$_3$) | Flocs Forming velocity (sec.) | Size | Settling velocity (min.) | Turbidity of supernatant liquor | pH |
|---|---|---|---|---|---|
| 2.0 | (¹) | | | 8.1 | 7.18 |
| 4.0 | 60 | Medium | 9 | 2.1 | 7.06 |
| 6.0 | 60 | Large | 4 | 0.9 | 6.98 |
| 8.0 | <30 | ...do... | 6 | 0.5 | 6.9 |
| 10.0 | <30 | ...do... | 9 | 0.2 | 6.8 |
| 15.0 | <30 | ...do... | 10 | 0.2 | 6.6 |

¹ Not formed.

From the above table, it is considered that, under these conditions, the optimum pH for coagulation is about 6.30 and the optimum amount of coagulant to be added is about 10 to 15 p.p.m. (calculated as Al$_2$O$_3$).

EXAMPLE 7

Cold-rolling waste water (turbidity 290°, pH 6.65, the turbid substance being mostly oil emulsified in water) resulting from the iron and steel industry was taken, and 500 ml. of the waste water was diluted to be 10 times, 250 p.p.m. of each of BACS–I, BACS–III and BAC of Example 4 were added to the diluted waste water, to which was further added a proper amount of NaOH solution to adjust the pH. The resulting liquid was subjected to the Jar Test mentioned before.

TABLE 9

| Coagulant | Flocs Forming velocity (sec.) | Size | Treated liquid Turbidity of supernatant liquor | pH |
|---|---|---|---|---|
| BACS–I | 28 | Large | 0.5 | 7.10 |
| BACS–III | 40 | Medium | 0.8 | 7.02 |
| BAC | 90 | ...do... | 1.2 | 7.65 |

According to the above table, each of the BACS shows better results than of BAC.

Further, in order to see the influences of the pH of raw water in the treatment, coagulation tests were made in the same manner explained before by varying pH. The results are shown in the following table.

TABLE 10

| BACS–I: | | | | | | |
|---|---|---|---|---|---|---|
| Floc forming velocity (sec.) | 60 | 30 | 20 | 20 | 15 | 20 |
| Turbidity | 1.0 | 0.6 | 0.2 | 0.1 | 1.2 | 6.3 |
| pH | 6.2 | 6.37 | 6.9 | 7.2 | 7.7 | 8.3 |
| BAC: | | | | | | |
| Floc forming velocity (sec.) | | 120 | 60 | 40 | 30 | 30 |
| Turbidity | 162.0 | 1.2 | 1.2 | 0.7 | 0.6 | 0.7 |
| pH | 6.7 | 7.01 | 7.6 | 8.4 | 9.3 | 9.7 |

In the above results, it is found that the optimum operative pH of BACS–I is about 7.2 but that of BAC is 9.3 and the turbidity in BACS–I reduces to 0.1 but that in BAC is above 0.6, a remarkable difference being seen between them. The difference between the optimum pH values will bring about a difference in the required amount of the alkali (for pH adjustment). Further, there is a great difference in the floc forming velocity between BACS–I and BAC.

EXAMPLES 8–10

100 mg. of kaolin powder were suspended in 1 liter of tap water. Turbidity 100°, pH 6.94, temperature of the water 13° C. This was subjected to jar test, after adding 5 p.p.m. (as Al$_2$O$_3$) each of various BACS and BAC

TABLE 11

| | Coagulants | Flocs Forming velocity (sec.) | Size | Settling velocity (min.) | Turbidity of supernatant | pH of supernatant |
|---|---|---|---|---|---|---|
| Example No.: | | | | | | |
| | BAC | 480 | Very small | (¹) | 16.7 | 6.85 |
| 8 | C-8 | 60 | Medium | 4 | 6.0 | 6.92 |
| 9 | C-9 | 30 | Large | 3 | 6.0 | 6.95 |
| 10 | C-10 | 30 | ...do... | 2 | 5.5 | 7.00 |

¹ Not settled completely.

In order to see the influences of the pH of raw suspension in the treatment, jar tests were made by using C-10 and BAC.

TABLE 12

| | Y | Y/R mol ratio | 0.25 N NaOH added (ml./l.) | Turbidity of supernatant | pH of supernatant |
|---|---|---|---|---|---|
| Coagulants: | | | | | |
| BAC | | 0 | 0.0 | 88 | 6.71 |
| | | 0 | 0.5 | 83 | 6.89 |
| | | 0 | 1.0 | 6.0 | 7.08 |
| | | 0 | 1.5 | 1.7 | 7.36 |
| | | 0 | 2.5 | 1.2 | 8.61 |
| C-10 | PO$_4$ | 0.25 | 0.0 | 5.0 | 6.72 |
| | PO$_4$ | 0.25 | 0.5 | 0.8 | 6.95 |
| | PO$_4$ | 0.25 | 1.0 | <0.1 | 7.17 |
| | PO$_4$ | 0.25 | 1.5 | 0.7 | 7.55 |
| | PO$_4$ | 0.25 | 2.5 | 1.2 | 8.57 |

EXAMPLES 11–15

The same kaolin suspension as in Examples 8–10 was subjected to jar test, after adding various coagulants. Before the treatment 0.5 cc. of 0.25 N NaOH was added to the suspension.

TABLE 13

| | Coagulants | Floc Forming velocity (min.) | Size | Settling velocity (min.) | Turbidity | pH |
|---|---|---|---|---|---|---|
| Example No.: | | | | | | |
| 11 | C-11 | 5 | Medium | 10 | 9.6 | 7.22 |
| 12 | C-12 | 1 | Large | 5 | 6.0 | 7.20 |
| 13 | C-13 | <1 | ...do... | 2 | 0.3 | 7.21 |
| 14 | C-14 | 5 | Medium | 8 | 10.6 | 7.20 |
| 15 | C-15 | 3 | Large | 4 | 6.3 | 7.18 |
| | BAC | 6 | Medium | 10 | 12.4 | 7.20 |

EXAMPLES 16–19

Basic aluminum nitrates (basicity 50.5%) containing succinic acid anions as Y in various amounts (see Preparation 5) were added to kaolin suspension, which was then subjected to jar tests.

TABLE 14

| Coagulants | Added, p.p.m. (as Al$_2$O$_3$) | Flocs Forming velocity (min.) | Size | Settling velocity (min.) | Turbidity | pH |
|---|---|---|---|---|---|---|
| Example No.: | | | | | | |
| | BAC | 5 | 2 | Small | 10 | 13.9 | 7.01 |
| 16 | C-16 | 5 | 2 | Medium | 10 | 6.5 | 7.04 |
| 17 | C-17 | 5 | 1 | do | 8 | 6.7 | 6.97 |
| 18 | C-18 | 5 | 1 | do | 8 | 3.0 | 7.01 |
| 19 | C-19 | 5 | 1 | do | 8 | 4.6 | 6.89 |

EXAMPLES 20–23

By using the coagulants C–20 to C–23 (Preparation 5) a series of jar tests were conducted in the same manner as in the preceding examples.

TABLE 15

| Coagulants | Added, p.p.m. (as Al$_2$O$_3$) | Flocs Forming velocity (min.) | Size | Settling velocity (min.) | Turbidity of supernatant | pH of supernatant |
|---|---|---|---|---|---|---|
| Example No.: | | | | | | |
| | BAC | 5 | 4 | Small | 8 | 5.6 | 7.40 |
| 20 | C-20 | 5 | <1 | Medium | 2 | 0.2 | 7.38 |
| 21 | C-21 | 5 | <1 | do | 2 | <0.1 | 7.40 |
| 22 | C-22 | 5 | <1 | do | 2 | <0.1 | 7.41 |
| 23 | C-23 | 5 | <1 | do | 3 | 0.8 | 7.40 |

EXAMPLES 24–27

In these examples, the coagulants C–24 to C–27 were employed and a series of jar tests were conducted in the same manner as in the preceding examples in respect of kaolin suspension.

TABLE 16

| Coagulants | 0.1 N—NaOH added (ml.) | Added, p.p.m. (as Cr$_2$O$_3$) | Flocs Forming velocity (min.) | Size | Settling velocity (min.) | Turbidity of supernatant | pH of supernatant |
|---|---|---|---|---|---|---|---|
| Example No.: | | | | | | | |
| | BAC | 0.5 | 5 | (¹) | | | 74.0 | 7.12 |
| 24 | C-24 | 0.5 | 5 | 9 | Very small | 5 | 8.8 | 7.16 |
| 25 | C-25 | 0.5 | 5 | 6 | Rather small | 3 | 1.5 | 7.13 |
| 26 | C-26 | 0.5 | 5 | 5 | Medium | 3 | 0.5 | 7.10 |
| 27 | C-27 | 0.5 | 5 | 4 | Rather large | 3 | 0.0 | 7.11 |

¹ Not formed.

What we claim is:

1. A coagulating agent for the treatment of an aqueous medium which comprises a basic metal salt of the formula:

$$M_n(OH)_m X_{3n-m}$$

wherein M is a metal selected from the group consisting of tri- or more valent metals, X is an anion selected from the group consisting of Cl, NO$_3$ and CH$_3$COO, $3n$ is larger than $m$, and having a basicity ($m/3n \times 100$) in the range of about 30 to 83%, and a multivalent anion (referred to as Y) having been chemically introduced in said basic salt, the amount of the anion Y being such that the molar ratio $Y/M$ is more than about 0.015 but less than the amount impairing the stability of said basic salt.

2. A coagulant as defined in claim 1 wherein Y is a sulfuric acid ion.

3. A coagulant as defined in claim 1 wherein Y is a phosphoric acid ion.

4. A process for preparing a coagulant of claim 1 which comprises adding a multivalent acid ion to a basic aluminum salt represented by the general formula $$M_n(OH)_m X_{3n-m}$$

(wherein M represents tri- or more valent metal, X represents a monovalent inorganic anion selected from Cl, NO$_3$ and CH$_3$COO and $3n$ is larger than $m$) and of a basicity ($m/3n \times 100$) in a range of about 30 to 83% and ageing the mixture.

5. A process for preparing a coagulant of claim 1 which comprises preparing a solution of a normal salt of tri- or more valent metal (M) containing a monovalent anion selected from Cl, NO$_3$ and CH$_3$COO and a sulfuric acid ion, adding to this solution a compound of a metal selected from Ca and Ba in an amount less than the equivalent in respect to the sulfuric acid ion, and separating the insoluble sulfate of Ca or Ba so that the sulfuric acid ion of a mol ratio of SO$_4$/M of more than about 0.015 may remain in the mother solution.

6. A process for preparing a coagulant of claim 1 which comprises decomposing tri- or more valent metal (M) into an acid selected from hydrochloric acid, nitric acid and acetic acid in an amount less than the equivalent and in the presence of di- or more valent acid ion (Y) in such an amount that the mol ratio $Y/M$ is more than 0.015 but less than that impairing the stability of the product.

7. A method of treating an aqueous medium by using a coagulating and flocculating agent of claim 1.

8. A method according to claim 7 which comprises adding to the aqueous medium the coagulating agent in an amount of about 1 to 10,000 p.p.m. as of metal oxide.

9. A method according to claim 7 wherein the treatment is conducted at a pH of about 4 to 10.

10. A method of treating an aqueous medium by using a coagulating and fluocculating agent of claim 2.

11. A method of treating an aqueous medium by using a coagulating and fluocculating agent of claim 3.

References Cited

UNITED STATES PATENTS 3,497,459  2/1970  Nakamura _____ 210—42 X

HAROLD ANSHER, Primary Examiner

M. E. McCAMISH, Assistant Examiner

U.S. Cl. X.R.

23—92; 210—42